United States Patent Office 3,193,085
Patented July 6, 1965

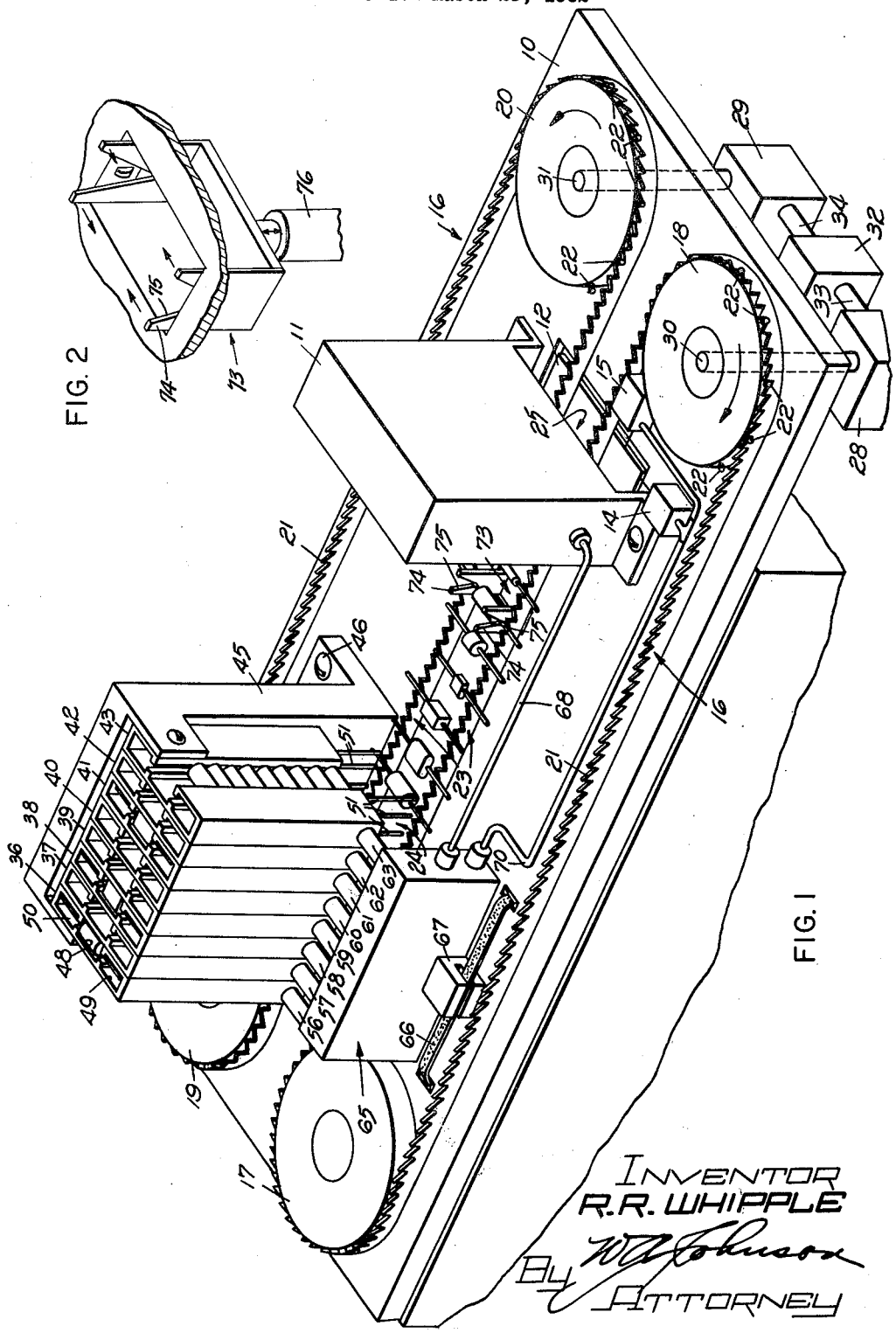

3,193,085
APPARATUS FOR CONVEYING COMPONENTS
Richard R. Whipple, Haverhill, Mass., assignor to Western Electric Company, Incorporated, New York, N.Y., a corporation of New York
Filed Mar. 29, 1962, Ser. No. 183,567
2 Claims. (Cl. 198—165)

This invention relates to an apparatus for feeding components, particularly components having axially aligned leads, to automatic component insertion machines.

Automatic machines have been designed to mount components with axial leads in their respective positions in wiring boards. Two such machines are shown in the patents to W. M. Hancock, 2,808,587 and 2,848,718. One of the problems encountered in machines of this type is the automatic feeding of the components thereto. An automatic feeding means is shown in the patent to W. M. Hancock, 2,856,887.

An object of the invention is to provide an apparatus which is simple in structure and more efficient in automatically feeding components with axially aligned leads to automatic component insertion machines.

According to the object, the invention comprises an apparatus for automatically feeding components having axially aligned leads to an automatic component insertion machine having an operating area and a wiring board carrier. The apparatus comprises two endless conveyors supported at parallel positions above a table and having inner portions movable in spaced parallel paths through a loading area and the operating area. Magazines for supporting stacks of components of predetermined types and having lower end outlets through which the components may be selectively released are mounted above the parallel portions of the conveyor so that the components may be released in a predetermined order and allowed to drop on these portions of the conveyor.

Other objects and advantages will be apparent from the following detailed description when considered in conjunction with the accompanying drawing wherein FIG. 1 is an isometric view of the apparatus, shown with an automatic component insertion machine and wiring board carrier; and FIG. 2 is an enlarged view of a centering mechanism for the apparatus.

In the present instance, the apparatus includes a table 10 on which an automatic component insertion machine 11 is mounted. This machine may be of the type disclosed in either of the two first mentioned W. M. Hancock patents for inserting electrical components into a wiring board 12 supported on a carrier which is operated by moving units 14 and 15.

Parallel endless conveyor belts 16 are supported by pairs of wheels 17–18 and 19–20. These wheels support the conveyor belts so that the serrated or notched upper edges thereof 21 are positioned uppermost, and the inner passes thereof, indicated generally at 23, extend in parallel paths. With this arrangement the teeth-like portions of the notches 21 in each conveyer belt extend upwardly in spaced relation with each other. Drive wheels 18 and 20 are equipped with pins 22 to cooperate with the notches in conveyor belts 16 to assure that a notch in each conveyor belt will always be located in opposite parallel relationship with a notch of the other conveyor belt, so that the two axially aligned leads of a component will be disposed at right angles to the direction of motion of the conveyor belts. The conveyor belts 16 utilized in the present instance are band-saw blades, which are sufficiently flexible to extend about the wheels 17 to 20 inclusive. The saw blades are of the coarse variety wherein the teeth are not of the cutting type but rather are contoured to serve as notches for holding and conveying the components in spaced parallel positions through a loading area indicated generally at 24 and an operating area indicated generally at 25. The operating area 25 is the area associated with the component inserting machine or unit 11 and the wiring board 12.

The means for driving the conveyor belts 16 includes Geneva drive units 28 and 29 connected to shafts 30 and 31 of wheels 18 and 20 for imparting intermittent motion to the conveyors. The units 28 and 29 are driven in synchronism by a drive unit 32 through shafts 33 and 34. The details of these various units need not be shown due to the fact that any commercially known units for accomplishing these results may be employed.

A plurality of magazines 36 to 43 inclusive are supported by a bracket 45 mounted at 46 on the table 10. The magazines 36 to 43 inclusive represent a selected number or group of components, all of the components in any one group being identical but the components in each of the different magazines being different. Furthermore, the number of magazines shown is for illustration only. They may vary in number depending on the number of different components to be inserted into the wiring board 12. It will be noted that the magazines have central portions 48 for receiving the components and end portions 49 and 50 for the axially aligned leads. The components may be fed to the tops of the magazines in any desired manner to keep the magazines filled and allowing the lowermost components in each magazine to rest on a suitable solenoid operable releasing mechanism, such as that shown in the last mentioned W. M. Hancock Patent 2,856,988. It will be apparent the central portions 48 of the magazines are located over the space between the portions 23 of the conveyors and that the leads of a component extend above the recesses or notches 21 in these portions of the conveyor belts. Each magazine is provided with two pairs of guides 51, which may be parallel as shown or may be angled inwardly toward each other to guide the leads of the components toward the notches 21.

In the present instance, the releasing means for each magazine is not shown in detail as any suitable releasing means, such as that mentioned in the aforementioned Hancock patent may be employed and may be responsive to the operation of solenoids 56 to 63 inclusive.

The solenoids 56 to 63 inclusive are responsive to a program control unit indicated generally at 65. This unit is operated by perforations in a tape 66 movable through a sensing unit 67. With the magazines 36 to 43 inclusive loaded with components of known types and with each wiring board 12 requiring predetermined components mounted at known positions therein, the tape 66 may be perforated to carry out the desired program for completing the mounting of the desired group of components in each wiring board. The programming unit 65 is arranged, through any well known means and circuits including a cable linkage 68 between the control unit 65 and the component insertion machine 11 to cause operation of the machine during the intervals of rest of the conveyors. Furthermore, through a cable linkage between the program control unit 65 and the positioning units 14 and 15 for the wiring boards 12, the necessary operations of the units 14 and 15 may be carried out for example, during movements of the conveyors to locate the wiring board 12 so that the desired portions thereof for the successive components may be positioned successively in the operating area. Therefore, it should be understood that the program, beginning with the tape, includes perforations in the tape for controlling not only the order of selection of the components so that they may drop onto the portions 23 of the conveyor belts but so that the tape will have other perforations controlling operations of the component mounting machine 11 during the intervals of rest of the conveyors and also movements of the wiring board 12 through the locating units 14 and 15 during the intervals of motion of the conveyors.

A centering unit 73 is interposed between the loading area 24 and the operating area 25, and includes two vertical members 74 which have substantially V-shaped notches 75 therein for receiving the axial leads of the components. The centering unit 73 may be supported by any suitable actuating means, such as an air cylinder 76, for movement from its normal down position, out of the path of the components into its top position, as shown, during the intervals when the conveyor belts are not moving. As the V-shaped vertical members approach their top position they are moved in resilient mountings toward each other, to assure that the body of the component is centered between conveyor belts 16 just before the component reaches the automatic component insertion machine 11, thus compensating for any axial error occasioned by the bounce when the component was dropped from its magazine or due to subsequent vibration or shock caused by the intermittent motion of the conveyor belts 16. The centering unit 73 is retracted to the down position before the conveyor belts are again advanced to the next position.

Operation

It should be understood that all of the operations are linked together, preferably through the program control unit 65 so that this unit will function in timed relation with the driving means 32. The Geneva units 28 and 29 drive the conveyors a certain distance during each intermittent motion, to present each set of notches to the loading area 24 at a predetermined time, thus permitting the components received from the magazines in component loading area 24 to reach operating area 25 in the proper predetermined order. It may not seem possible with the numerous magazines 36 to 43 inclusive in the loading area to deposit the components in a desired order on the conveyor portion 23. However, this action is made possible through the program control unit in this manner; namely, the dropping of the components in what may be termed an out of order arrangement so that they will actually appear on the conveyor belts in the order desired. For example, if a component from magazine 36 is to be placed on the conveyor belts adjacent a component from magazine 43 the solenoid 56 may be actuated to release its respective component from magazine 36 a predetermined number of intervals prior to the interval in which the solenoid 63 is actuated to release its component from magazine 43. Therefore, when the solenoid 63 is actuated to release its respective component, the component from magazine 36 has moved forwardly a given number of distances and is now located in front of or immediately behind the pair of notches to receive the component from the magazine 43. This is one example of how, through the program control unit, the perforated tape 66 controls the operation of solenoids 56 to 63 inclusive in order to cause releasing of the desired components in accordance with a pre-arranged program, and so that during successive operations of the component insertion machine 11, the desired succession of components is fed thereto one at a time and the wiring board 12 is adjusted for this pre-arranged group of components.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:
1. Apparatus for conveying components having axial leads from a component source to a component insertion machine comprising:
   a table,
   a first pair of spaced wheels mounted on said table,
   a second pair of wheels mounted on said table in spaced parallel relationship with and in the same plane as the first pair of wheels,
   endless bands mounted on each of said pairs of wheels, the inner passes of said bands being a predetermined distance apart,
   equally spaced notches in the upper edges of each of said bands shaped such for receiving the leads of components dropped from the component source to thereby support them between the bands,
   driving means,
   means connecting said driving means to one wheel of each pair for imparting identical intermittent motion thereto,
   pin means mounted on the peripheral portions of the driven wheels and extending radially therefrom, said pin being located so as to be receivable in said notches to thereby form driving connections between the wheels and the bands and to coordinate the intermittent movement of the two bands, and
   means mounted between the inner passes of the notched bands for centering the components thereon prior to their arrival at the component insertion machine.
2. Apparatus for conveying components having axial leads according to claim 1 wherein:
   said means for centering said components comprises spaced, vertically extending members having V-shaped notches at the top portions thereof, and actuating means operatively connected to said members and operable to move said members from a first position where said members are disposed adjacent to and beneath the bands to a second position where the members are spaced relatively closer together than in the first position with the base of the V-shaped notches being level with the bottom of the band notches.

References Cited by the Examiner
UNITED STATES PATENTS

| | | | |
|---|---|---|---|
| 1,535,785 | 4/25 | Lun | 198—165 X |
| 2,856,998 | 10/58 | Hancock | 1—323 X |
| 2,868,413 | 1/59 | Vossen | 1—323 X |
| 2,911,646 | 11/59 | Vossen | 1—323 X |
| 3,016,540 | 1/62 | Taynton | 1—321 |
| 3,078,466 | 2/63 | Harrold et al. | 1—323 |

SAMUEL F. COLEMAN, *Primary Examiner.*
GRANVILLE Y. CUSTER, WILLIAM B. LA BORDE,
*Examiners.*

UNITED STATES PATENT OFFICE
CERTIFICATE OF CORRECTION

Patent No. 3,193,085                                                July 6, 1965

Richard R. Whipple

It is hereby certified that error appears in the above numbered patent requiring correction and that the said Letters Patent should read as corrected below.

Column 4, line 29, for "pin" read -- pin means --.

Signed and sealed this 3rd day of May 1966.

(SEAL)
Attest:

ERNEST W. SWIDER                                     EDWARD J. BRENNER
Attesting Officer                                            Commissioner of Patents